(12) United States Patent
Fujimori et al.

(10) Patent No.: US 6,587,167 B1
(45) Date of Patent: Jul. 1, 2003

(54) UNIT FOR PRECISION MOUNTING ELECTRO-OPTICAL DEVICES

(75) Inventors: Motoyuki Fujimori, Suwa (JP); Masashi Kitabayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/495,178

(22) Filed: Feb. 1, 2000

(30) Foreign Application Priority Data

Feb. 2, 1999 (JP) .......................................... 11-025345

(51) Int. Cl.⁷ .......................................... G02F 1/1333
(52) U.S. Cl. .......................................... 349/58; 353/119
(58) Field of Search .................. 349/58, 60; 353/119; 361/681

(56) References Cited

U.S. PATENT DOCUMENTS

| 5,835,139 A | * | 11/1998 | Yun et al. ...................... 349/58 |
| 5,868,485 A | * | 2/1999 | Fujimori et al. ............. 353/119 |
| 5,978,054 A | * | 11/1999 | Fujimori ....................... 349/60 |
| 6,053,616 A | * | 4/2000 | Fujimori et al. ............. 353/119 |
| 6,056,407 A | * | 5/2000 | Iinuma et al. ............... 353/119 |

FOREIGN PATENT DOCUMENTS

| EP | 0 803 754 A1 | 10/1997 |
| JP | 10-10994 | 1/1998 |
| JP | A-10-239783 | 9/1998 |
| JP | A-11-272195 | 10/1999 |

* cited by examiner

Primary Examiner—Julie Ngo
(74) Attorney, Agent, or Firm—Oliff & Berridge, PLC

(57) ABSTRACT

An electrode-optical device mounting unit for a projector is disclosed. The mounting unit includes a panel frame body holding liquid-crystal-panels and having a plurality of holes provided in the periphery thereof, and fixing pins each having a flat part formed at one end surface thereof and a deformed part formed at an end on the side different from the side on which the flat part is formed. The fixing pins are inserted into the holes, wherein a light-incident surface of a prism composition and the flat part of each of the fixing pins are fixed by an adhesive agent, and the inside of the holes of the panel frame body and an outer peripheral surface of each of the fixing pins are fixed by an adhesive agent.

19 Claims, 11 Drawing Sheets

UNIT FOR PRECISION MOUNTING ELECTRO-OPTICAL DEVICES

BACKGROUND OF THE INVENTION

1. Field of Invention

The present invention relates to a unit for mounting an electro-optical device, such as a liquid crystal panel, to a prism, such as a dichroic prism or a polarization beam splitter, and to a projector using the same.

2. Description of Related Art

An example of a conventional projector relating to the present invention in which an electro-optical device, such as a liquid crystal panel, is mounted to a prism is disclosed, for example, in Japanese Unexamined Patent Publication No. 10-10994. Thus, the art disclosed in Japanese Unexamined Patent Publication No. 10-10994 will be briefly described with reference to an exploded view of FIG. 9.

A liquid-crystal-panel unit 70R is mounted to a light-incident surface 72R of a prism composition 72 of a projector. The panel unit 70R is composed of an innermost fixed frame body 76 bonded and fixed to the light-incident surface 72R of the prism composition 72, an outermost panel frame body 73 for accommodating and holding a liquid crystal panel 80R, and an intermediate frame body 77 disposed between the fixed frame body 76 and the panel frame body 73. The panel frame body 73 has a first frame body 74 and a second frame body 75, and further, holds the liquid crystal panel 80R by sandwiching between these frame bodies 74 and 75.

Engaging projections 77b projected outward from four corners of the intermediate frame body 77 are fitted and bonded into engaging holes 74b formed in four corners of the panel frame body 73 (the first frame body 74 thereof), and a spacer 78 having a substantially triangular prism shape is interposed between the intermediate frame body 77 and the panel frame body 73 so as to bond and fix the intermediate frame body 77 and the panel frame body 73.

Process steps for obtaining the above construction will be described hereinbelow with reference to a flowchart shown in FIG. 10.

That is, the fixed frame body 76 is first located on the light-incident surface 72R of the prism composition 72, and is bonded and fixed by an adhesive agent (S1). Then, the intermediate frame body 77 is located outside the bonded and fixed fixed frame 76, and is fixed by inserting four screws 79 into tapped holes 77a and 76a (S2).

Thereafter, an adhesive agent is charged into the engaging holes 74b that are formed in the first frame body 74 of the panel frame body 73 in which the liquid crystal panel 80R is accommodated and held, and the panel frame body 73 is attached to the intermediate frame body 77 by fitting the engaging projections 77b of the intermediate frame body 77 into the engaging holes 74b (S3).

Next, the liquid crystal panel 80R is turned on in this state (S4), and focus adjustment and alignment adjustment of the liquid crystal panel 80R are performed (S5 and S6). These steps S4 to S6 are performed to adjust the position of the liquid crystal panel 80R on the optical axis and the position of inclination relative to the position of the liquid crystal panel 80R.

Next, the adhesive agent charged in the engaging holes 74b is hardened to temporarily fix the intermediate frame body 77 and the panel frame body 73 (S7). Thereafter, a shift amount of the position of pixels of the liquid crystal panel 80R is checked (S8). Consequently, when the shift amount is beyond an allowable range (bad), the panel frame body 73 is removed (S13), and the procedure returns to the aforementioned step S3.

On the other hand, when the shift amount is within the allowable range (good), the adhesive agent is applied to the spacer 78 (S9), and the spacer 78 is mounted to a predetermined guide section formed between the temporarily fixed intermediate frame body 77 and the panel frame body 73 (S10). Then, by hardening the adhesive agent among the spacer 78, the panel frame body 73, and the intermediate frame body 77, the panel frame body 73 is actually fixed to the prism composition 72 (S11).

In the case of the above conventional device, however, the fixed frame body fixed to the prism projects over the outer periphery of the prism in order to secure a fixing screw hole, whereby a reduction in size of the device is hindered. In addition, since the structure requires the fixed frame body and the intermediate frame body, a further reduction in size of the prism unit is hindered.

Furthermore, many fixing devices and steps are required for fixing the liquid crystal-panel-unit to the prism, such as screws for fixing the fixed frame body and the intermediate frame body, a projection of the intermediate frame body and a hole of the panel frame body for temporarily fixing the panel frame body and the intermediate frame body, and a spacer and an adhesive agent for actually fixing the panel frame body and the intermediate frame body. Therefore, there is room for improvement from the viewpoints of operation efficiency and positioning accuracy.

SUMMARY OF THE INVENTION

Thus, the present invention proposes a projector capable of fixing an electro-optical device and a prism only by several fixing pins and an adhesive agent instead of a conventional fixed frame plate and a spacer to thereby achieve a reduction in size of the projector, simplification and an improvement in the efficiency of the fixing operation of the light synthesizer and the electro-optical device, and an increase in positioning accuracy.

In order to achieve the above object, the present invention employs a projector having an electro-optical device for modulating light, a prism to which the electro-optical device is mounted, and a projection lens for projecting modulated light. The projector may further include an electro-optical device frame body for holding the electro-optical device and having a plurality of holes provided in the periphery thereof, and fixing pins each having a flat part on one end surface thereof and inserted into the holes. The light-incident surface of the prism and the flat part of each of the fixing pins are fixed by an adhesive agent, and the insides of the holes of the electro-optical device frame body and an outer peripheral surface of each of the fixing pins are also fixed by an adhesive agent.

In addition, an electro-optical device-mounting unit for mounting an electro-optical device for modulating light to a prism, may include an electro-optical device frame body for holding the electro-optical device and having a plurality of holes provided in the periphery thereof. Fixing pins each having a flat part on one end surface thereof are inserted into the holes. A light-incident surface of the prism and the flat part of each of the fixing pins may be fixed by an adhesive agent, and the insides of the holes of the electro-optical device frame body and an outer peripheral surface of each of the fixing pins may be fixed by an adhesive agent.

According to these structures, the fixed frame body that has protruded from the periphery of the conventional prism is not required, so that a reduction in size of the device is achieved and moreover, it is possible to narrow a clearance between the prism and the electro-optical device frame body to a suitable range (within 3 mm, preferably 1 mm to 2 mm). Furthermore, since the number of assembling components is reduced and the fixing pins are placed in the holes, the positioning operation of the electro-optical device frame body is facilitated, and efficiency of fixing operation of the electro-optical device is improved. In addition, it is found from experiments that the fixing pins can be easily removed from the prism.

In addition, the contour of the electro-optical device frame body may be located at or inside of the outer periphery of the light-incident surface of the prism. According to this, the electro-optical device can be fixed at the inside of the outer periphery of the prism, and a reduction in size of the device can be achieved according to the size of the prism.

Also, the electro-optical device frame body may have substantially a rectangular shape, and the holes are provided in four corners of the electro-optical device frame body. According to this, the electro-optical device can be fixed to the prism by uniform force, positioning can be performed with higher accuracy, and the electro-optical device can be uniformly fixed to the periphery of the prism, so that impact resistance is improved.

Also, each of the fixing pins may have a deformed part at an end on the side different from the side on which the flat part is provided, and the deformed part protrudes from the surface of the electro-optical device frame body. According to this, the fixing pins can be easily inserted into the holes of the electro-optical device frame body by utilizing the deformed part for chucking, and positioning thereof can be easily performed.

In addition, each of the fixing pins may have a barrel shape in which central part is expanded. According to this, the electro-optical device frame body can be moved freely using the center part of the fixing pin as a fulcrum according to distortion of field of the projection lens, and the positioning operation of the electro-optical device is further facilitated.

In addition, each of the fixing pins may have a shape in which the central part is made thinner than both ends. According to this, elasticity of the fixing pin is improved at the central part, so that a stress applied to a bonded portion of the electro-optical device and the prism due to the difference in thermal expansion coefficient is reduced at this part, and a shift of pixels can be reduced.

Furthermore, the periphery of the flat part of each of the fixing pins may have chamfered, or a groove is provided in the outer peripheral surface on the side of the flat part of each of the fixing pins. According to this, it is possible to prevent the adhesive agent from flowing downward from the fixing pin.

DETAILED DESCRIPTION OF PREFERRED EMBODIMENTS

Figure 1:
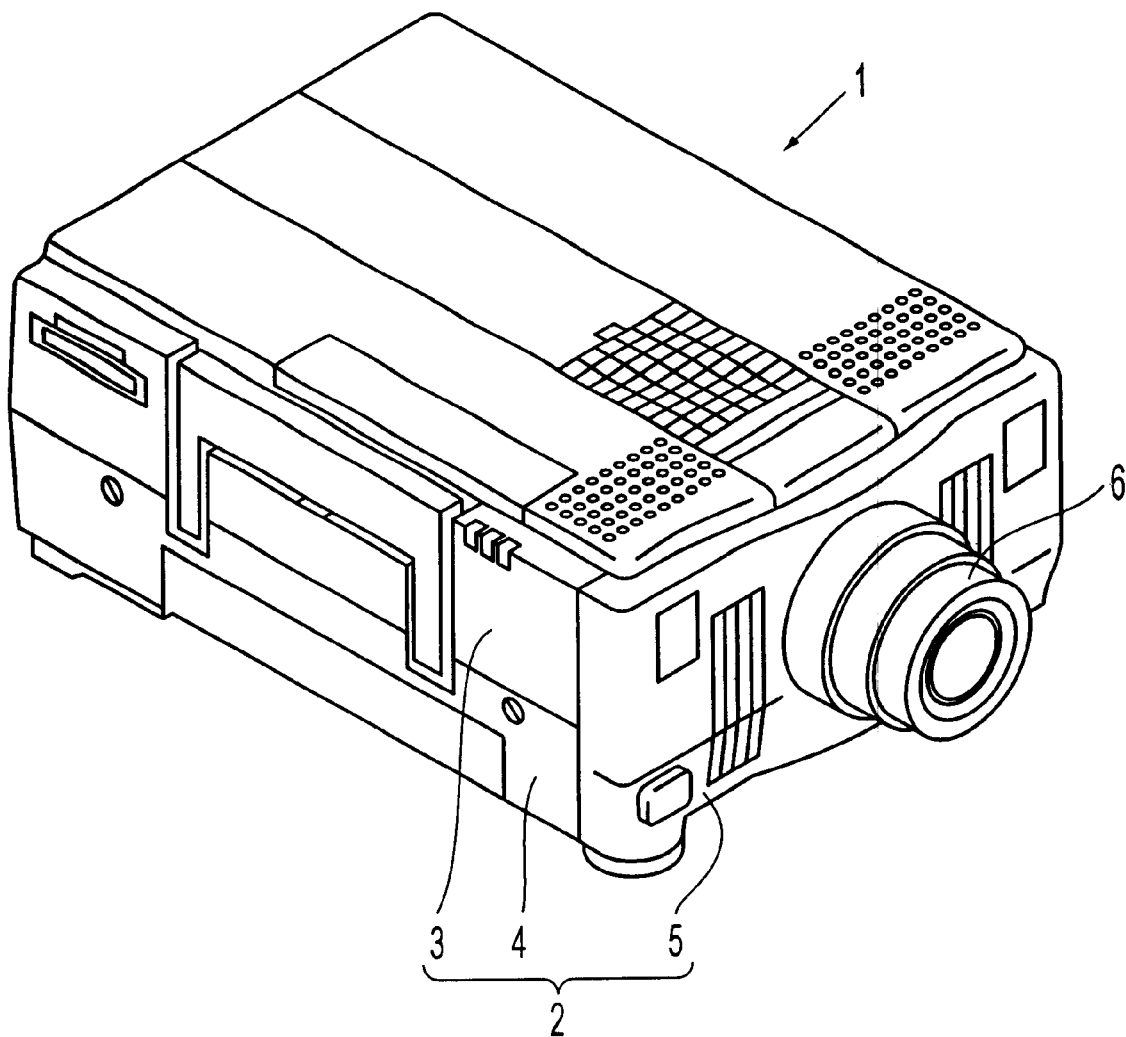
FIG. 1 is a perspective view showing an external appearance of a projector to which the present invention is applied.

Next, the preferred embodiments of the present invention will be described with reference to the drawings. FIG. 1 shows an external appearance of a projector to which a method according to the present invention is applied. An outer casing 2 of a projector 1 of this embodiment is shaped like a rectangular parallelepiped. The outer casing 2 is basically composed of an upper casing 3, a lower casing 4, and a front casing 5 for defining the front of the device. The leading end of a projection lens unit 6 protrudes from the center of the front casing 5.

Figure 2A:
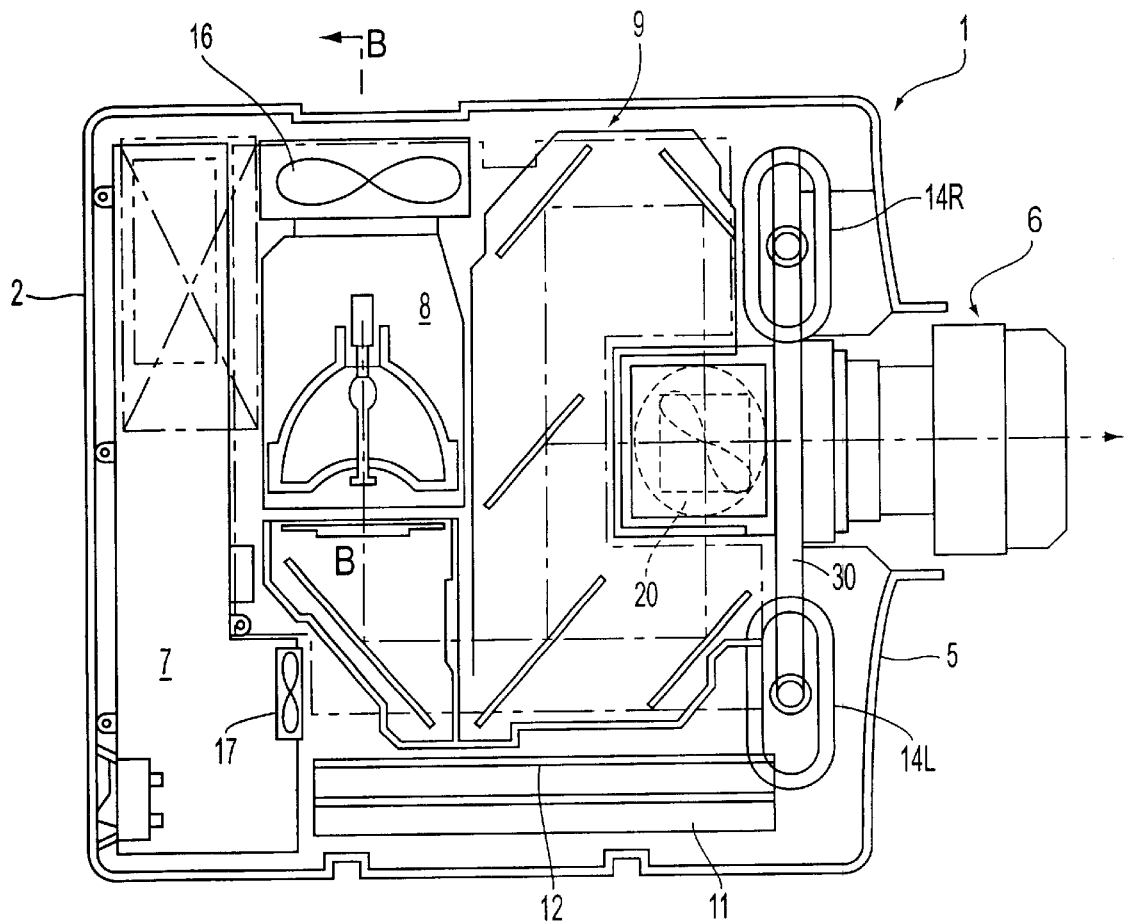
FIG. 2(A) is a diagram showing the two-dimensional layout of components inside the device shown in FIG. 1.
Figure 2B:
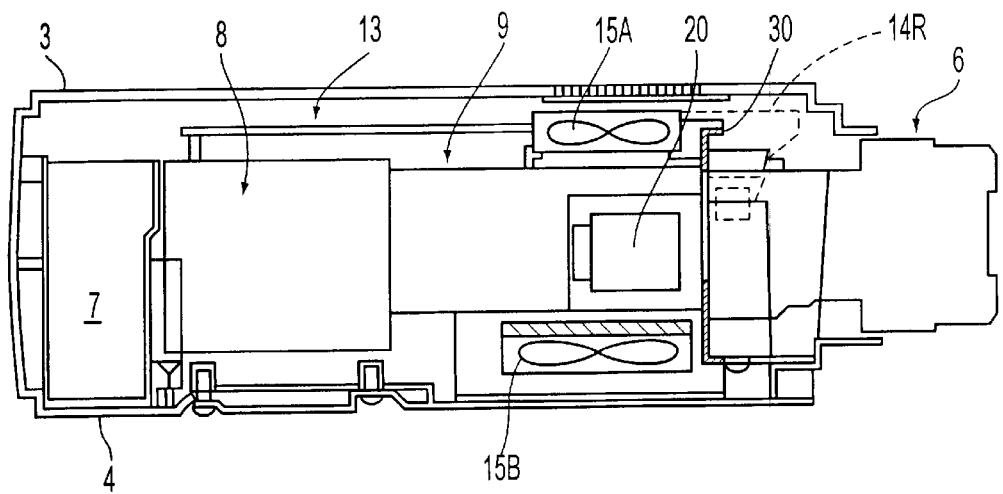
FIG. 2(B) is a diagram showing the three-dimensional layout of the components.

FIG. 2 shows the layout of components inside the outer casing 2 of the projector 1. As shown in this figure, a power supply unit 7 is disposed on the rear end of the inside of the outer casing 2. A light source lamp unit 8 and an optical unit 9 are disposed at positions adjacent to and offset from the power supply unit 7 toward the front side of the device. Furthermore, positioned at the front center of the optical unit 9 is the base end of the projection lens unit 6.

On the other hand, an interface substrate 11 with an input-output interface circuit mounted thereon is located on the side of the optical unit 9 so that it extends toward the front and rear of the device, and a video substrate 12 with a video signal processing circuit mounted thereon is located in parallel therewith. Furthermore, a control substrate 13 for controlling the drive of the device is disposed above the light source lamp unit 8 and the optical unit 9, and speakers 14R and 14L are disposed at the right and left front corners of the device, respectively.

Suction fans 15A and 15B for cooling the inside of the device are disposed above and below the optical unit 9. In addition, an exhaust fan 16 is disposed on the side surface of the device, that is, at the rear of the light source lamp unit 8. Moreover, an auxiliary cooling fan 17 for sucking the cooling air stream from the suction fan 15A into the power supply unit 7 is disposed at the position in the power supply unit 7 facing the ends of the substrates 11 and 12.

Of these fans, the fan 15B mainly serves as a fan for cooling liquid crystal panels 40R, 40G, and 40B to be described hereinbelow. The fan 15A can also be used for cooling the liquid crystal panels 40R, 40G, and 40B.

Figure 3A:
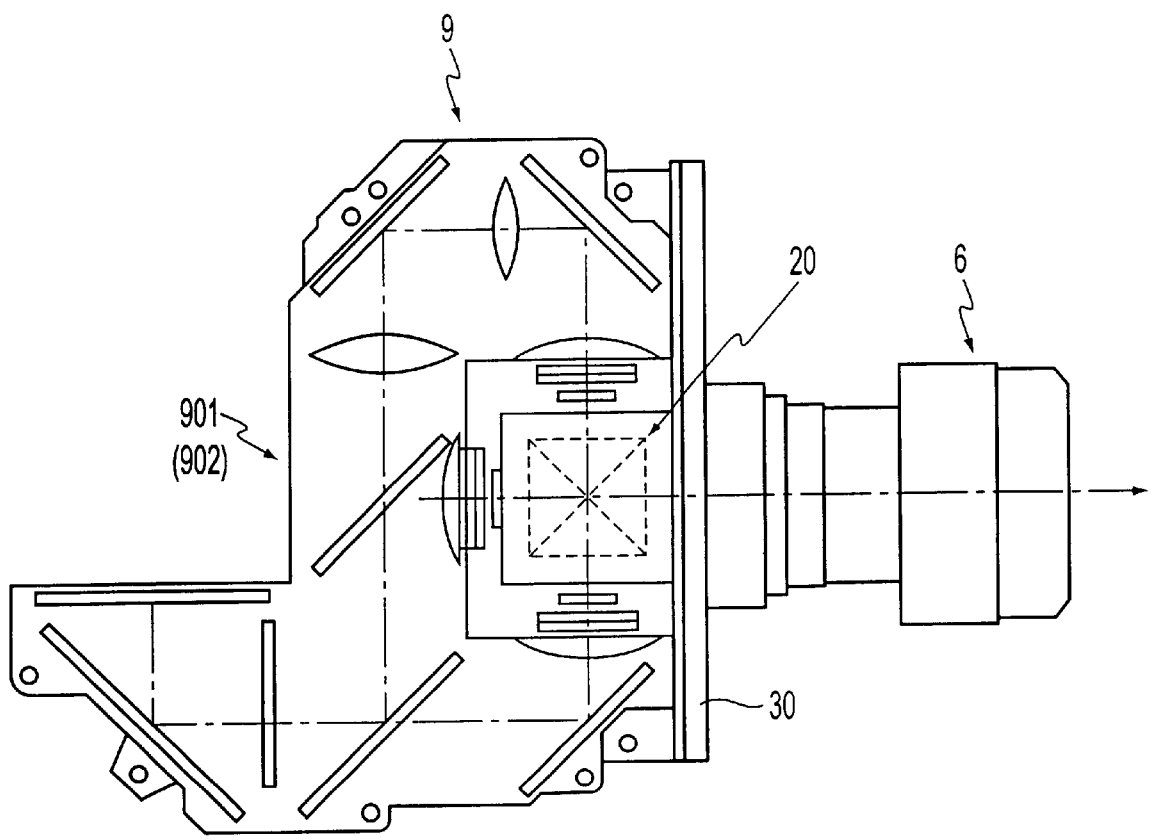
FIG. 3(A) is a diagram showing an optical lens unit and a projection lens unit.

Configurations of the optical unit 9 and an optical system will now be described with reference to FIG. 3. FIG. 3(A) shows the optical unit 9. As shown in this figure, the configuration is such that optical elements other than a prism unit 20 are included a color synthesizer thereof are vertically sandwiched and held between upper and lower light guides 901 and 902. The upper light guide 901 and the lower light guide 902 are fixed by fixing screws on the sides of the upper casing 3 and the lower casing 4, respectively. In addition, these upper and lower light guides 901 and 902 are similarly fixed by fixing screws on the side of the prism unit 20.

The prism unit 20 is fixed by fixing screws on the rear of a thick head plate 30 formed of a die-cast plate. The base end of the projection lens unit 6 serving as a projection lens is similarly fixed by fixing screws on the front of the head plate 30. Therefore, in this embodiment, a structure is such that the prism unit 20 and the projection lens unit 6 are fixed so as to be combined so that the head plate 30 is sandwiched therebetween.

Figure 3B:
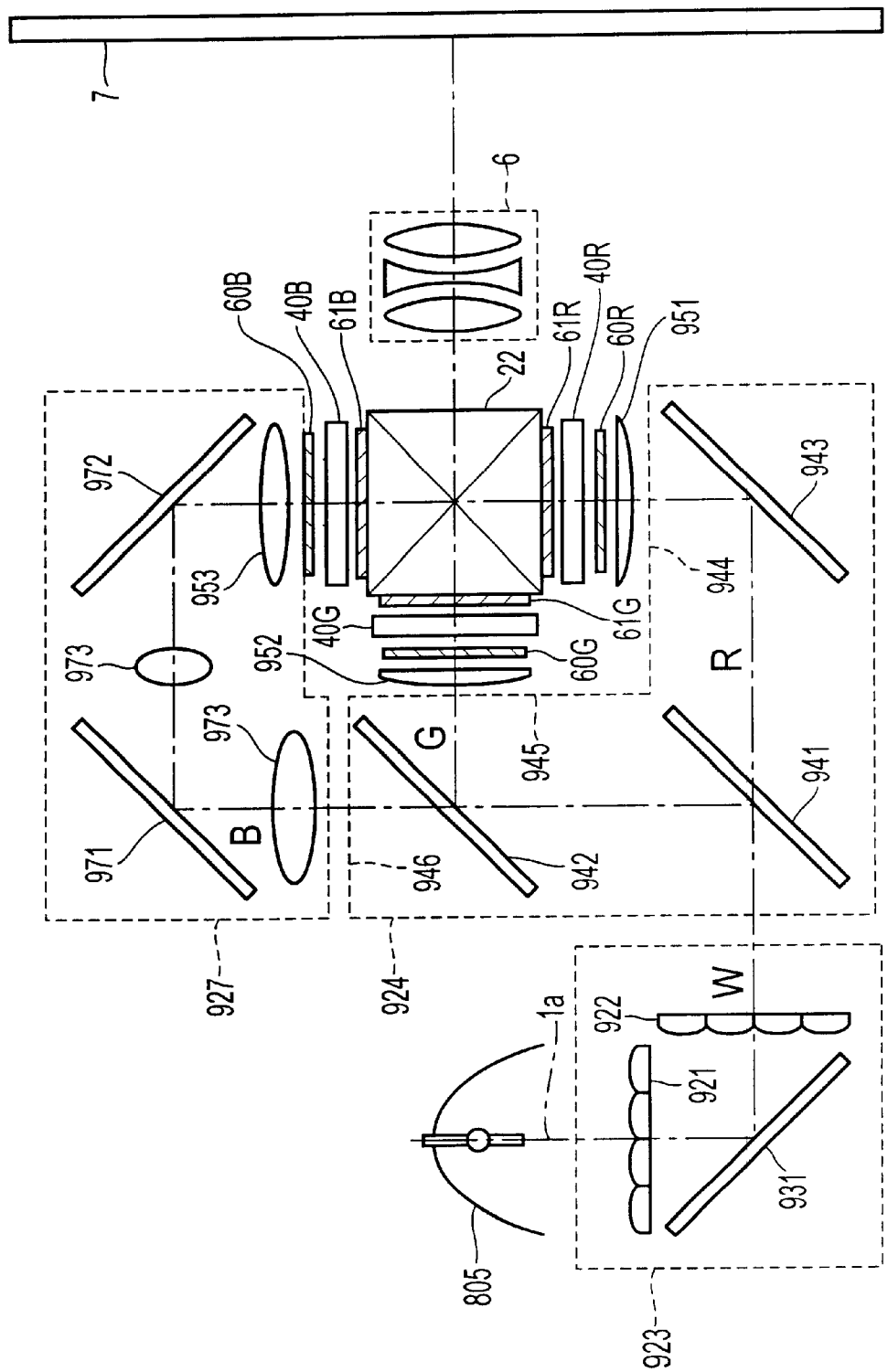
FIG. 3(B) schematically illustrates a configuration of an optical system.

FIG. 3(B) schematically shows the configuration of an optical system incorporated in the projector 1. The optical system of this embodiment is composed of a light source lamp 805, a uniform illuminating optical system 923 having integrator lenses 921 and 922 which are uniform illuminating optical elements, a color separation optical system 924 for separating a light W emitted from the illuminating optical system 923 into red, green, and blue lights R, G, and B, three liquid crystal panels 40R, 40G, and 40B serving as electro-optical devices for modulating the color lights, a prism composition 22 serving as a color synthesizing optical system for synthesizing modulated color lights, and a projection lens unit 6 for enlarging and projecting the modulated light onto a projection plane. In addition, the optical system includes a relay optical system 927 for guiding the blue light B in the color lights separated by the color separation optical system 924 to the corresponding liquid crystal panel 40B.

The uniform illuminating optical system 923 further includes a reflecting mirror 931 so as to bend an optical axis 1a of light emitted from the light source lamp 805 into right angles toward the front of the device. The integrator lenses 921 and 922 intersect at right angles so that the reflecting mirror 931 is located therebetween.

The color separation optical system 924 is composed of a blue-and-green-reflecting dichroic mirror 941, a green-reflecting dichroic mirror 942, and a reflecting mirror 943. First, the blue light B and the green light G contained in the light W passing through the uniform illuminating optical system 923 are reflected at right angles by the blue-and-green-reflecting dichroic mirror 941, and are directed toward the green-reflecting dichroic mirror 942. The red light R passes through the mirror 941, is reflected at right angles by the reflecting mirror 943 located behind, and is emitted from an emitting section 944 for the red light toward the color synthesizing optical system. Next, only the green light G of the blue and green lights B and G reflected by the mirror 941 is reflected at right angles by the green-reflecting dichroic mirror 942, and is emitted from an emitting section 945 for the green light toward the color synthesizing optical system. The blue light B passing through the mirror 942 is emitted from an emitting section 946 for the blue light toward the relay optical system 927. In this embodiment, all the distances between the emitting section for the light of the uniform illuminating optical element and the emitting sections 944, 945, and 946 in the color separation optical system 924 are substantially equally set.

Condenser lenses 951 and 952 are disposed on the emitting sides of the emitting sections 944 and 945 for the red light and the green light in the color separation optical system 924. Therefore, the red light and the green light emitted from the emitting sections respectively enter the condenser lenses 951 and 952, where they are collimated.

The collimated red and green lights R and G enter the liquid crystal panels 40R and 40G to be modulated, and are given image information corresponding thereto after the polarization direction thereof has been adjusted by polarizers 60R and 60G. That is, these liquid crystal panels 40R and 40G are subjected to switching control according to an image signal corresponding to image information by a driving device (not shown), whereby the color light passing therethrough is modulated. As such a driving device, any well-known driving device may be used unchanged.

On the other hand, the blue light B, after the polarization direction has been further adjusted by the polarizer 60B, is guided to the corresponding liquid crystal panel 40B via the relay optical system 927, where it is similarly modulated according to image information. The liquid crystal panels 40R, 40G, and 40B of this embodiment using, for example, a polysilicon TFT as a switching element may be used.

The relay optical system 927 is composed of a condenser lens 974, an incident-side reflecting mirror 971, an emitting-side reflecting mirror 972, an intermediate lens 973 disposed between these mirrors, and a condenser lens 953 disposed upstream of the liquid crystal panel 40B. The blue light B of the color lights has the longest optical path length, that is, the distance between the light source lamp 805 and the liquid crystal panel for the blue light B is the longest, and therefore, the amount of light of this light to be lost is the largest. The light amount loss can, however, be restricted by interposing the relay optical system 927 therebetween.

The color lights modulated through the liquid crystal panels 40R, 40G, and 40B enter polarizers 61R, 61G, and 61B, respectively, and light transmitted thereby is allowed to enter a prism composition 22, where it is synthesized. In this embodiment, a color synthesizing optical system is formed using the prism composition 22 including a dichroic prism. A color image synthesized in the prism composition 22 is enlarged and projected via the projection lens unit 6 onto a projection plane 7 located at a predetermined position.

Figure 4:
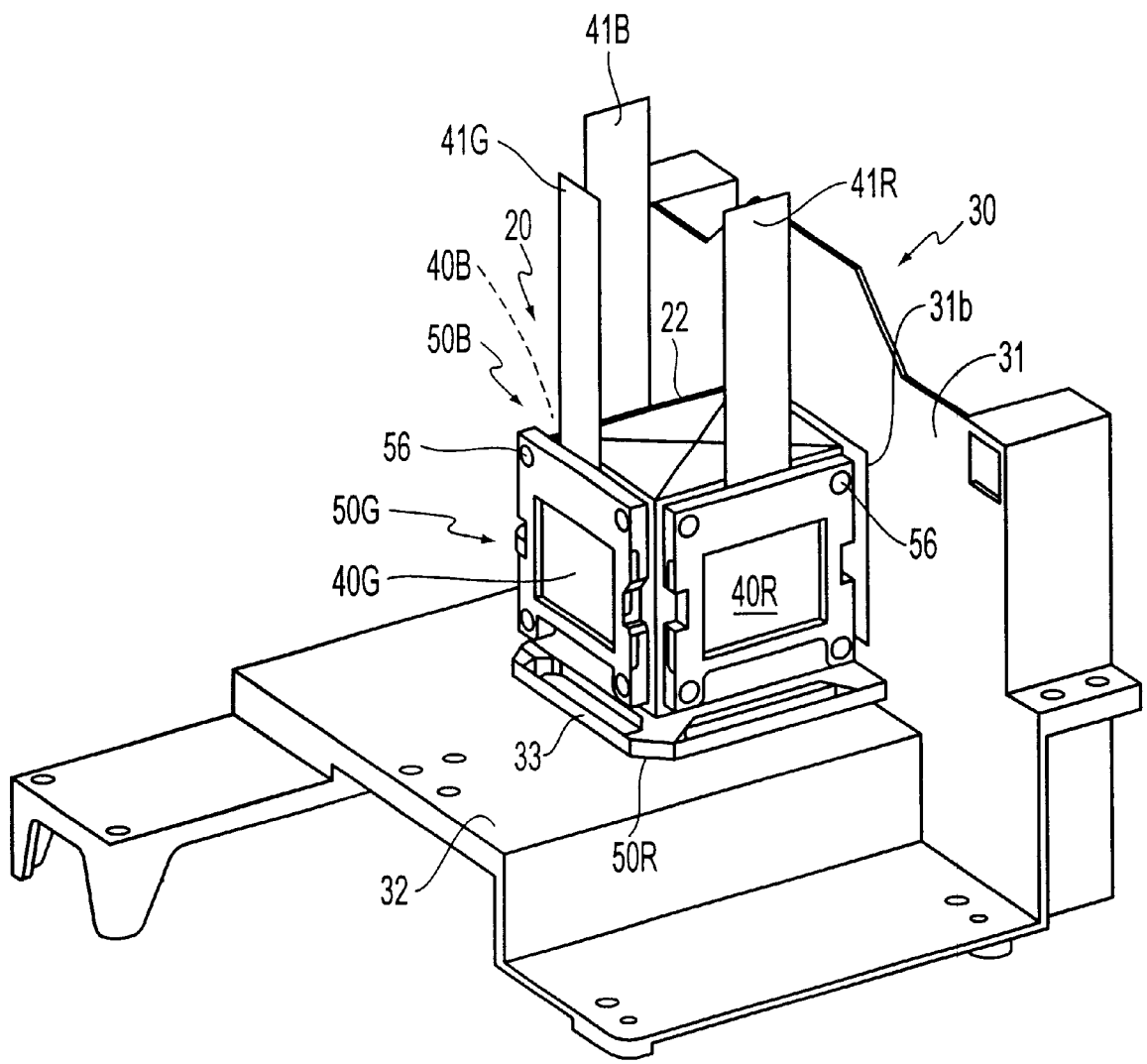
FIG. 4 is a perspective view showing the relationship among a head plate, a prism unit, and a liquid-crystal-panel unit.

Next, configurations of the prism unit 20 and the head plate 30 will now be described with reference to FIG. 4. FIG. 4 shows the head plate 30, the prism unit 20 attached to the head plate 30, and liquid-crystal-panel units 50R, 50G, and 50B. As shown in this figure, the head plate 30 is basically composed of a vertical wall 31 extending along a width direction of the device in a vertical attitude, and a bottom wall 32 extending horizontally from the lower end of the vertical wall 31. A rectangular opening 31b is formed in the vertical wall 31 for passing therethrough light emitted from the prism unit 20. In addition, numbers of reinforcing ribs are formed on the vertical wall 31 to increase rigidity thereof. The prism unit 20 and the projection lens unit 6 are fixed with the vertical wall 31 sandwiched therebetween and aligned (see FIG. 3(A)). Therefore, the integrity of these components is high, and there is very little risk of occurrence of a mutual shift of the positions thereof even if impact force or the like acts thereon.

The prism unit 20 is provided on a top face of the bottom wall 32 of the head plate 30. The prism unit 20 includes the prism composition 22 shaped like a rectangular parallelepiped formed by bonding inclined planes of four prisms 21, each of which is substantially equilateral triangle in cross section, and a prism support plate 33 (see FIG. 5). The bottom of the prism composition 22 is fixed to the surface of the prism support plate 33 by way of bonding or the like, and the prism support plate 33 is attached and fixed to the bottom wall 32 of the head plate. Attached to three side surfaces serving as light-incident surfaces in side surfaces of the prism composition 22 are liquid-crystal-panel units 50R, 50G, and 50B including the liquid crystal panels 40R, 40G, and 40B, respectively.

Figure 5:
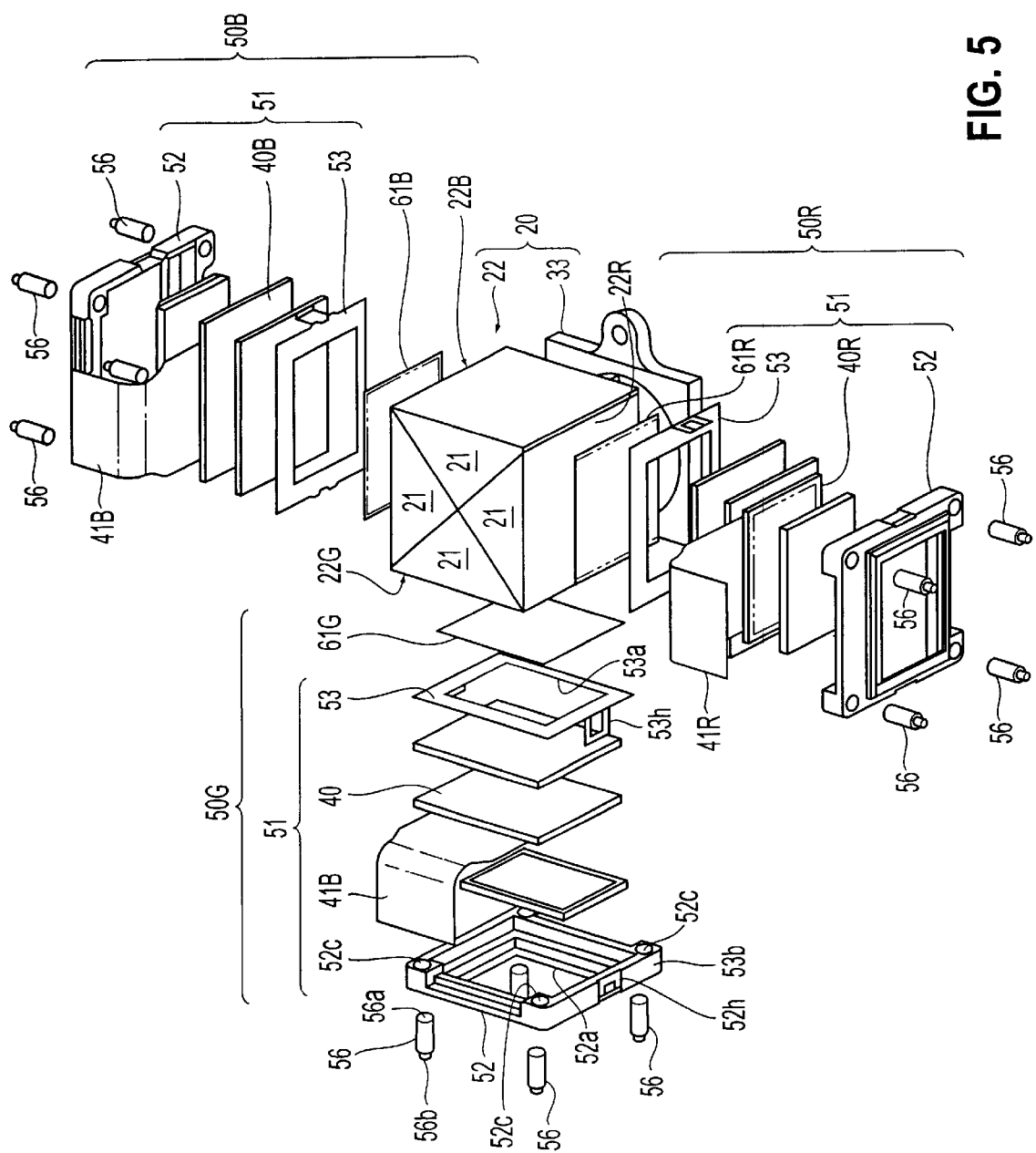
FIG. 5 is an exploded perspective view showing components of the liquid-crystal-panel unit.

Next, a description will be given of configurations of the liquid-crystal-panel units 50R, 50G, and 50B attached to the prism unit 20 (or the prism composition 22) and characterizing this embodiment with reference to an exploded view of the liquid-crystal-panel units of FIG. 5. Since the liquid-crystal-panel units 50R, 50G, and 50B are of the same configuration, the liquid-crystal-panel unit 50G will be mainly described hereinbelow. When the figure is easy-to-see according to an angle thereof, however, the description will be given with reference to units of 50R and 50B.

The liquid-crystal-panel unit 50G includes a panel frame body (electro-optical device frame body) 51 for accommodating and holding therein the liquid crystal panel 40G that is an electro-optical device. The panel frame body 51 includes a first frame body 52 disposed on the side of the light source (outside), and a second frame body 53 disposed on the side of the prism composition 22 (inside), and the liquid crystal panel 40G is clamped between these frame bodies.

Furthermore, the panel frame body 51 has a size (outer shape) accommodated in the light-incident surface 22G of the prism composition 22, and fixing pins 56 are inserted into four corners thereof. The panel frame body 51 is located and fixed on the light-incident surface 22G of the prism composition 22 via the fixing pins 56 and an adhesive agent.

The structure of the fixing pin 56 will be described in detail hereinbelow. A member extending upward from the panel frame body 51 is a wiring flexible cable 41G, 41B or 41R.

The first frame body 51 is basically a rectangular frame body having a rectangular opening 52a formed in the inner area and a peripheral wall 52b having a fixed thickness. The peripheral wall 52b has a space provided inside thereof for accommodating therein the liquid crystal panel, engaging grooves 52h engaging the second frame body 53 are formed in left and right sides of the peripheral walls 52b, and holes 52c through which the fixing pins 56 can pass are provided in four corners of the peripheral wall 52b. Each of the holes 52c has a size such that it has even a clearance between the hole 52c and the fixing pin 56 into which the adhesive agent enters.

If the first frame body 52 is a molded article of thermosetting resin into which carbon fiber or calcium carbonate is mixed, thermal expansion coefficient thereof nears that of glass constituting the prism, as compared to a general resin material. For this reason, a shift of pixels due to thermal deformation can be reduced in a state where it is fixed to the prism composition 22.

The second frame body 53 is intended to hold the liquid crystal panel accommodated in the first frame body 52, and is a plate frame body having a rectangular opening 53a formed in the inner area thereof. Hooks 53h engaging with the engaging grooves 52h of the first frame body 52 are formed on left and right outsides of the second frame body 53.

The first frame body 52 and the second frame body 53 are fitted to each other by the above engaging grooves 52h and the hooks 53h on both sides of the liquid crystal panel 40G to form the panel frame body 51. In this case, the holes 52c of the first frame body 52 are located outside of the outer peripheries of the liquid crystal panel 40G and the second frame body 53 so that the holes 52c do not become obstacles for the fixing pins 56 to pass therethrough so as to reach the prism composition 22.

The structure of the panel frame body 51 is not limited to this example, and the panel frame body 51 may basically have a structure such that it can hold the liquid crystal panels, and it has through holes for the fixing pins 56 in the periphery thereof so that the liquid crystal panels can be stably fixed to the prism composition 22.

Next, a method for mounting the liquid-crystal-panel units 50R, 50G, and 50B to the prism unit 20 will be described in detail with reference to a mounting flow of the liquid-crystal-panel units shown in FIG. 6. First, the polarizers 61R, 61G, and 61B are affixed to the light-incident surfaces 22R, 22G, and 22B of the prism composition 22 of the prism unit 20 (step S1 shown in FIG. 6). On the other hand, the insides of the holes 52c of the panel frame body 51 and the fixing pins 56 are degreased by alcohol or the like (steps S2 and S3 in FIG. 6).

Figure 6:
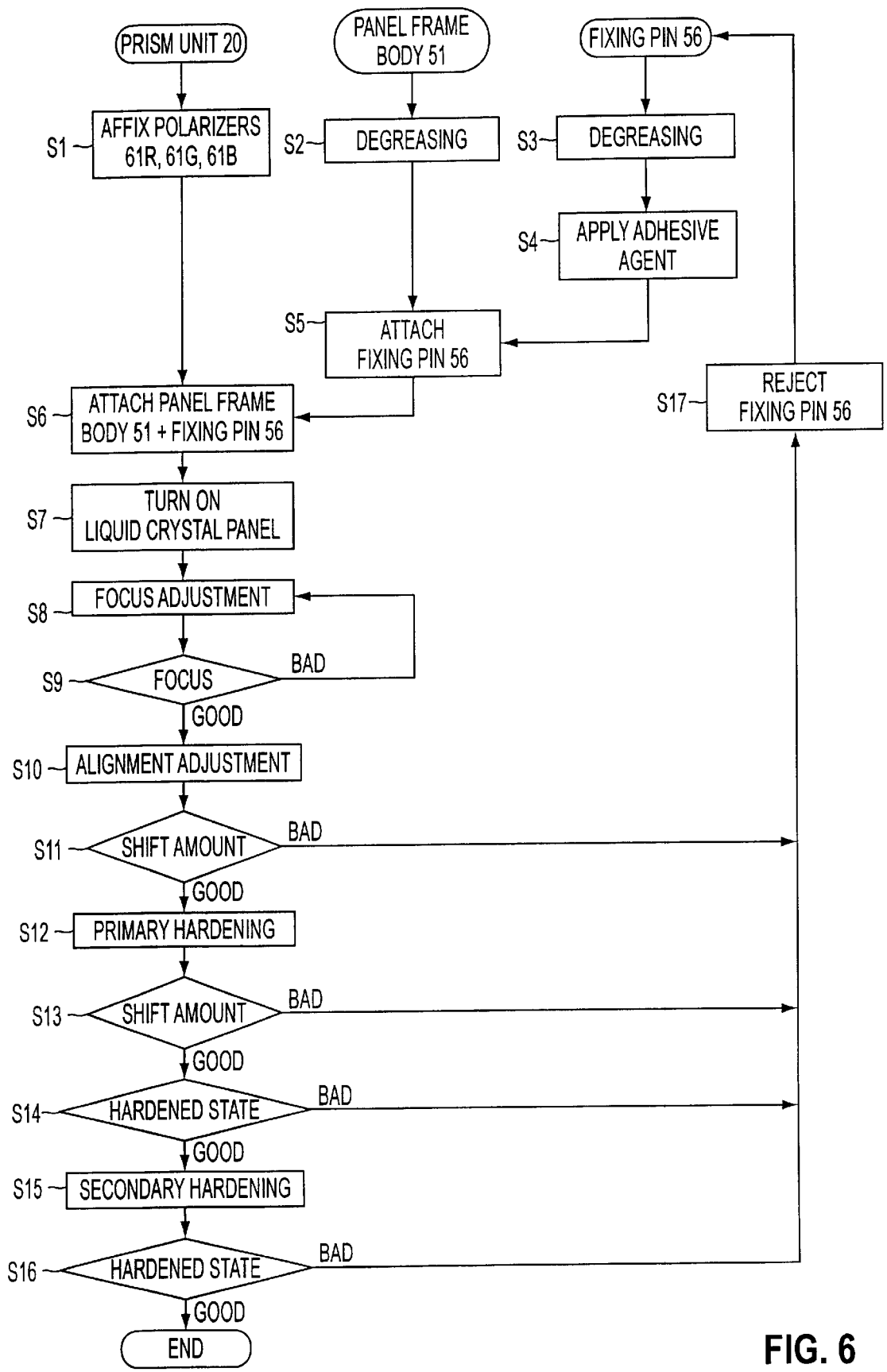
FIG. 6 is a flowchart showing a liquid-crystal-panel unit mounting method according to the embodiment of the present invention.

Next, an adhesive agent is applied to flat parts 56a and outer peripheral surfaces 56c of the fixing pins 56 (step S4 shown in FIG. 6). The fixing pins 56 are inserted into the holes 52c of the panel frame body 51 with the flat parts 56a faced to the prism and chucked using deformed parts 56b that are protruded on the other side thereof (step S5 shown in FIG. 6). Then, the panel frame body 51 having the fixing pins 56 inserted therein is attached to the light-incident surfaces 22R, 22G, and 22B of the prism composition 22 utilizing the flat parts 56a of the fixing pins 56 (step S6 shown in FIG. 6). In this state, the fixing pins 56 are merely attached to the prism composition 22 by surface tension of the adhesive agent on the flat parts 56a thereof.

Next, the liquid crystal panels 40R, 40G, and 40B are turned on (step S7 shown in FIG. 6). Then, focus adjustment is performed to adjust focus planes of the liquid crystal panels 40R, 40G, and 40B clamped by the panel frame body 51 to a focus plane of the projection lens 6 (step S8 shown in FIG. 6). In this step S8, adjustment in three axes directions is performed using a position in the direction of the x-axis (x), an inclination (xθ) of a rotation direction with reference to the x-axis, and an inclination (yθ) of a rotation direction with reference to the y-axis when an optical axis of the projection lens unit 6 is taken as the z-axis, and two axes intersecting to the z-axis at right angles are taken as the x-axis and the y-axis. The adjustment is performed with reference to portions near liquid crystal layers of the liquid crystal panels 40R, 40G, and 40B. After the focus adjustment, a focus state is checked (step S9 shown in S6). If the result of the focus adjustment is bad, the procedure returns to step S8 to perform the focus adjustment again.

In step S9, if the result of the focus adjustment is good, alignment adjustment is further performed to adjust the position of pixels of the liquid crystal panels 40R, 40G, and 40B (step S10 shown in FIG. 6). In this step S10, adjustment in three axes directions is performed using positions of the liquid crystal panels 40R, 40G, and 40B in the direction of the x-axis (x), positions in the y direction (y), and an inclination (zθ) of a rotation direction with reference to the z-axis when an optical axis of the projection lens unit 6 is taken as the z-axis,.and two axes intersecting to the z-axis at right angles are taken as the x-axis and the y-axis. The alignment adjustment may preferably be performed with reference to one of the pixels of the three liquid crystal panels 40R, 40G, and 40B, however, it may be performed individually.

While performing the focus adjustment and the alignment adjustment, the fixing pins 56 change the positions and directions thereof in accordance with the action of the panel frame body 51 resulting from adjusting operation while being held by surface tension of the adhesive agent in the holes 52*c*. After the alignment adjustment, the shift amount of the pixels of the liquid crystal panels 40R, 40G, and 40B is checked (step S11 shown in FIG. 6). When the shift amount is beyond the allowable range (bad), the fixing pins 56 are rejected (step S17 shown in FIG. 6) to be replaced with new fixing pins 56, and step S3 and subsequent steps are repeated.

On the other hand, when the shift amount of the pixels is within the allowable range (good) in step S11, primary hardening of the adhesive agent among the fixing pins 56, the prism composition 22, and the panel frame body 51 is performed (step S12 shown in FIG. 6). When an ultraviolet hardening-type adhesive agent is used as the adhesive agent, the hardening is performed by irradiating the adhesive agent with ultraviolet rays for a predetermined period. A period for irradiating the ultraviolet rays in this case varies with a type and an amount of the adhesive agent, however, the period is usually several tens seconds to several minutes.

Next, the shift amount of the pixels of the liquid crystal panels 40R, 40G, and 40B is checked again (step S13 shown in FIG. 6). When the shift amount is beyond the allowable range (bad), the fixing pins 56 are rejected (step S17 shown in FIG. 6) to be replaced with new fixing pins 56, and step S3 and subsequent steps are repeated, as in the case of step S11.

On the other hand, when the shift amount of the pixels is within the allowable range (good), the hardened state of the adhesive agent among the fixing pins 56, the panel frame body 51, and the prism composition 22 is checked (step S14 shown in FIG. 6). When the hardened state is bad, the fixing pins 56 are rejected (step S17 shown in FIG. 6) to be replaced with new fixing pins 56, and step S3 and subsequent steps are repeated, as in the case of step S13.

In contrast, when the hardened state is good, secondary hardening of the adhesive agent between the fixing pins 56 and the panel frame body 51 and between the fixing pins 56 and the prism composition 22 is performed (step S15 shown in FIG. 6).

It is also possible to complete the hardening of the adhesive only by one hardening step without performing the secondary hardening. However, it is more preferable from a viewpoint of enhancing throughput to divide the hardening step into two steps, as in this embodiment.

In addition, it is more preferable from a viewpoint of increasing reliability to divide the hardening step into two steps, to determine the shift amount of the position and the hardened state before performing the secondary hardening, and to re-perform the steps when the shift amount and the hardened state are bad. Furthermore, since the steps can be re-performed before performing the final secondary hardening, the advantage is provided such that the fixing pins 56 are easily removed.

After performing the secondary hardening, the hardened state of the adhesive agent between the fixing pins 56 and the panel frame body 51 and between the fixing pins 56 and the prism component 22 is checked again (step S16 shown in FIG. 6). When the hardened state is bad, the fixing pins 56 are rejected (step S17 shown in FIG. 6) to be replaced with new fixing pins 56, and step S3 and subsequent steps are repeated. On the other hand, when the hardened state is good, mounting of the liquid-crystal-panel units 50R, 50G, and 50B to the prism unit 20 is completed.

Figure 7:
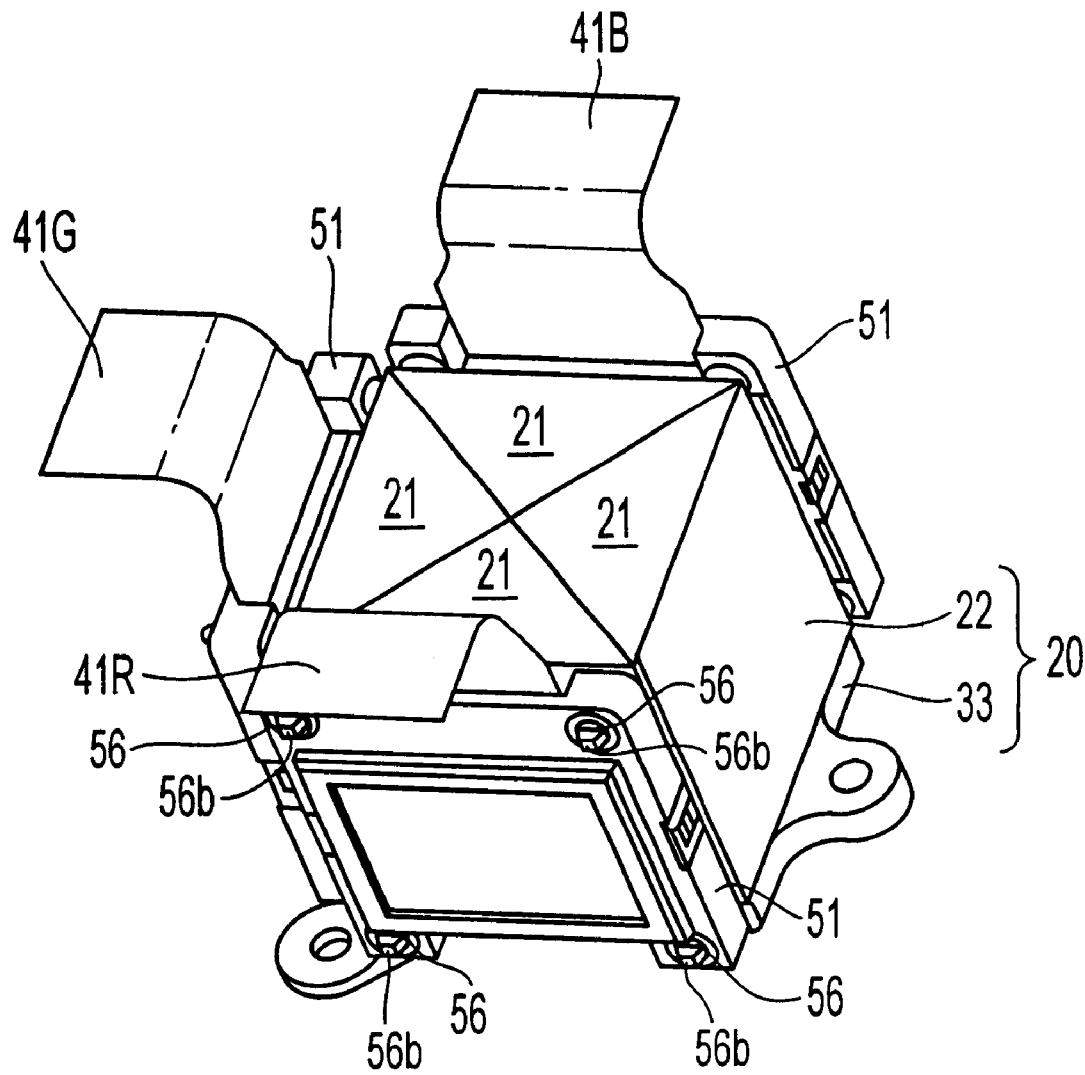
FIG. 7 is a diagram showing assembled prism unit and the liquid-crystal-panel unit according to the embodiment of the present invention.

A state where the liquid-crystal-panel units 50R, 50G, and 50B are mounted and fixed to the prism unit 20 is shown in FIG. 7.

As shown in FIG. 7, if the deformed parts 56*b* on the rear of fixing pins 56 are protruded from the surface of the panel frame body 51, the protruded deformed parts 56*b* are conveniently utilized as chucks when the panel frame body 51 is fixed to and removed from the prism unit 20.

The fixing pin 56 will now be described in detail. As has already been described, the fixing pin 56 has the flat part 56*a* bonded and fixed to the prism composition 22, the deformed part 56*b* located on the other end of the flat part 56*a* and having a shape distinguished from other part, and the outer peripheral surface 56*c* that is a part between the flat part 56*a* and the deformed part 56*b* and is fixed on the inner surface of the hole 52*c*. The fixing pin 56 having these elements can be formed in various shapes shown in FIG. 8.

Figure 8A:
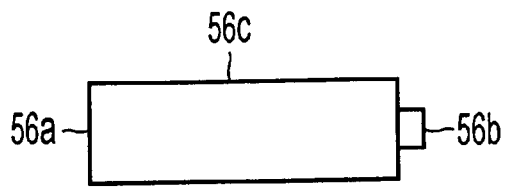
FIGS. 8(A)–8(E) include perspective views each showing a shape of a fixing pin used in the embodiment of the present invention.
Figure 8B:
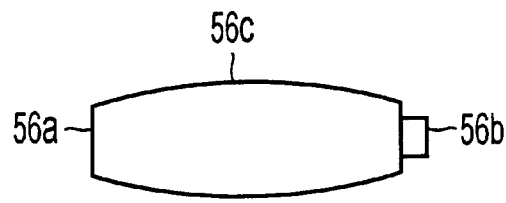

FIG. 8(A) shows the most fundamental shape in which the outer peripheral surface 56*c* is formed into a cylinder, an end thereof is flattened to form the flat part 56*a*, and a convex deformed part 56*b* is formed on the rear end. FIG. 8(B) shows a barrel shape in which the central part of the cylinder shown in FIG. 8(A) is expanded. According to this shape, since the panel frame body 51 can move freely using the central part as a fulcrum, positioning operation can be performed more easily.

Figure 8C:
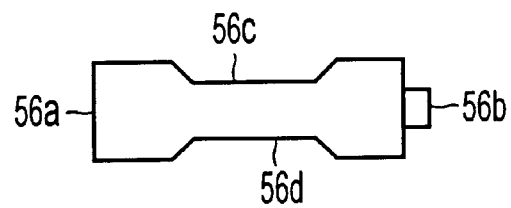

FIG. 8(C) shows a shape in which the central part of the cylinder is made thinner than both ends thereof so that the thin central part has elasticity higher than both ends. An elastic portion 56*d* absorbs a stress applied to a bonded part due to difference in thermal expansion coefficient, and a shift of pixels due to temperature changes can be reduced.

Figure 8D:
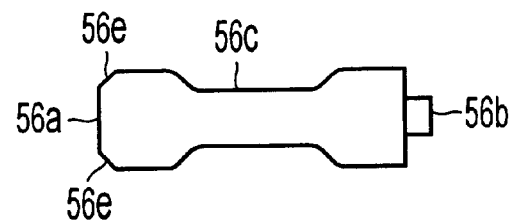
Figure 8E:
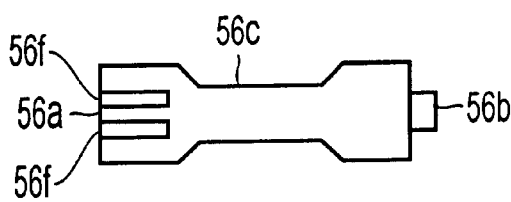
Figure 9:
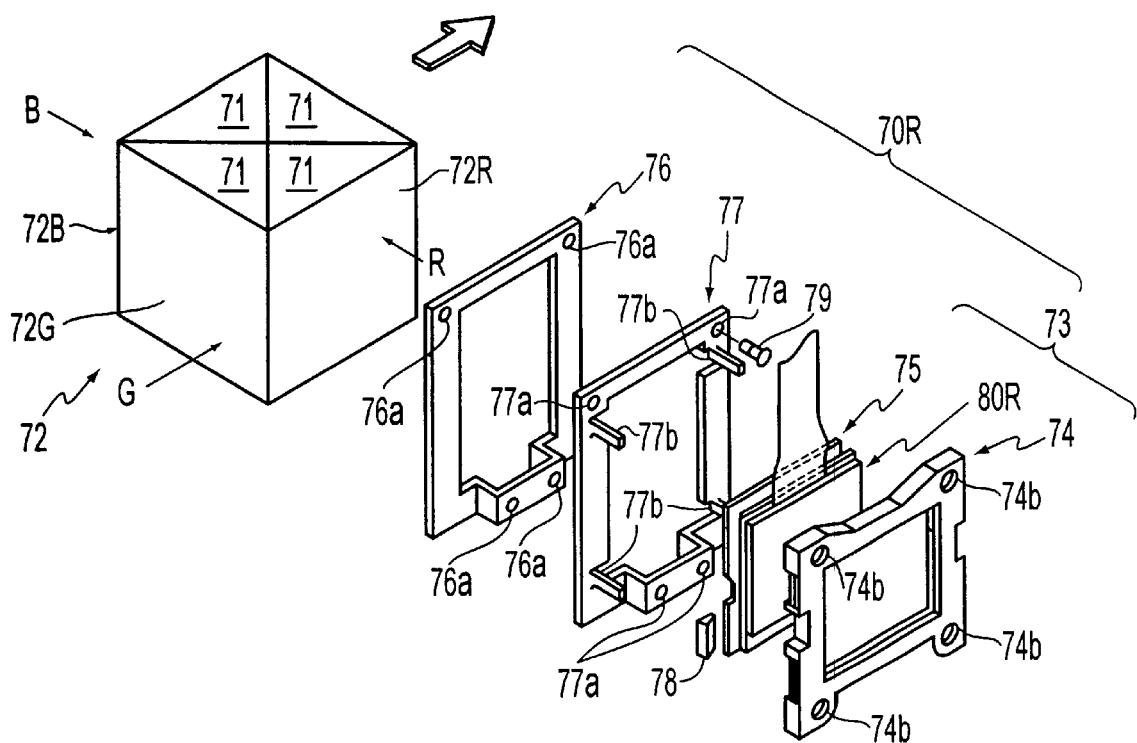
FIG. 9 is an exploded view showing a configuration of a liquid-crystal-panel unit of a conventional projector.
Figure 10:
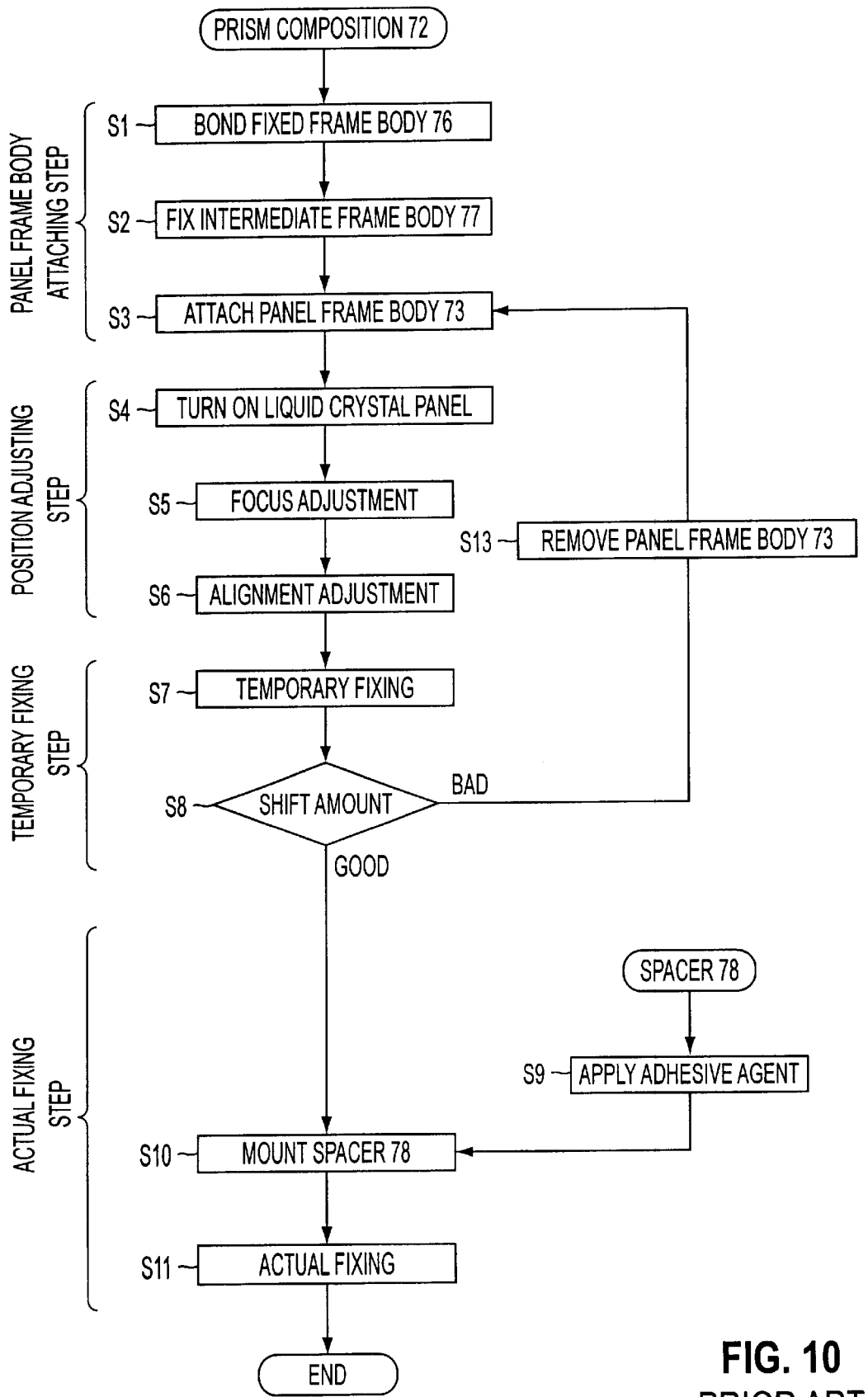
FIG. 10 is a flowchart showing a liquid-crystal-panel unit mounting method in the conventional projector.

FIG. 8(D) shows a shape in which the periphery of the flat part 56*a* of the fixing pin 56 is chamfered. FIG. 8(E) shows a shape in which grooves are formed in the outer peripheral surface 56*c* on the side of the flat part 56*a* of the fixing pin 56. According to these shapes, the adhesive agent enters into chamfered portions 56*e* and grooves 56*f* during bonding and fixing, whereby the adhesive agent is prevented from flowing downward. The size and number of the grooves 56*f* are suitably determined according to circumstances.

In general, such a fixing pin 56 made of glass can be used. However, when the first frame body 52 is a resin molded article, the thermal expansion coefficient thereof is large as compared to the glass and therefore, the fixing pin 56 may be easily separated from the frame body due to difference in thermal expansion or may be broken by temperature changes. In order to avoid the separation or the breakage, the fixing pin 56 may preferably be an acrylic resin molded article or the like.

The fixing pin 56 can be molded by being formed by an acrylic material, so that the cost can be substantially reduced as compared to glass. Incidentally, if a material for transmitting ultraviolet rays is used for the material of the fixing pin 56, an ultraviolet hardening-type adhesive agent of less temperature rise and having short hardening period can be used as the adhesive agent for bonding and fixing the fixing pin 56.

In this way, according to this embodiment, it is possible to stably fix the panel frame body 51 holding the liquid crystal panels 40R, 40G, and 40B, respectively, to the prism composition 22 by utilizing only four fixing pins 56 and the adhesive agent.

In addition, positioning of the liquid crystal panels 40R, 40G, and 40B and the light-incident surface of the prism composition 22 is performed by the flat parts 56*a* inserted into the holes 52*c* of the panel frame body 51 while moving the panel frame body 51 along the outer peripheral surfaces 56*c* of the fixing pins 56 bonded onto the light-incident surface of the prism composition 22. Therefore, the positioning operation becomes easier, and positioning accuracy is increased.

While the present invention has been described above based on the specific embodiment, the present invention is not limited to the above-described embodiment, various modifications and changes can be made, and the modifications and changes are included in the present invention as long as they are within the technical concepts.

For example, the following modifications can be made.

(1) While an example has been described in the above embodiment in a case where the present invention is applied to a projector using a transmissive liquid crystal panel, it is possible to apply the present invention to a projector using a reflective liquid crystal panel. In addition, as described hereinbelow, the electro-optical device is not limited to the liquid crystal panel. Here, "transmissive" means that the electro-optical device, such as a liquid crystal panel, is of a type for transmitting light, and "reflective" means that the electro-optical device, such as a liquid crystal panel, is of a type for reflecting light.

According to the projector employing the reflective electro-optical device, a dichroic prism like the prism composition 22 may be used as a light separator for separating light into light of three colors of red, green, and blue, and may also be used as a light synthesizer for synthesizing and emitting modulated light of three colors in the same direction. In addition, a polarization beam splitter may be disposed between the electro-optical device and the color synthesizer. In the latter case, it is possible to apply the present invention to a configuration in which the electro-optical device is fixed to the surface of the polarization beam splitter. When the present invention is applied to the reflective projector, advantageous effects that are substantially similar to those of the transmissive projector can also be obtained.

(2) In addition, the electro-optical device is not limited to the liquid crystal panel (such as a liquid crystal light valve), and may be, for example, a device using a micro-mirror, or a CCD (charge coupled device).

Also, the prism is not limited to the dichroic prism like the prism composition 22 in which two types of color-selecting planes are formed along the bonded surfaces of four triangular prisms, and may be a dichroic prism having one color-selecting plane or a polarization beam splitter. In addition, the prism may be one in which a light-selecting plane is disposed in a light-transmitting box having a substantially hexahedron shape, and liquid is charged therein.

(3) Furthermore, the projectors include a front projector that performs projection from a direction in which a projected image is observed, and a rear projector that performs projection from the side opposite to the direction in which the projected image is observed, and the configuration shown in the above embodiments is applicable to either of them.

According to the invention of the present application, an electro-optical device frame body for holding an electro-optical device is fixed to a prism by an adhesive agent via fixing pins inserted into holes that are provided in the periphery of the electro-optical device frame body, whereby a fixed frame plate attached to the prism is not required, and a reduction in size of the device can be achieved. Simultaneously, since attendant preparatory operations can be reduced, the invention can contribute to reduced cost.

Furthermore, during focus adjustment and alignment adjustment of the electro-optical device, follow-up property of the fixing pins is improved, efficiency of assembling operation can be improved, and an increase in positioning accuracy can be achieved.

What is claimed is:

1. A projector, comprising:
   an electro-optical device that modulates light;
   a prism to which the electro-optical device is mounted;
   a projection lens that projects the modulated light;
   an electro-optical device frame body that holds the electro-optical device and has a plurality of holes provided in a periphery thereof; and
   fixing pins each having a flat part on one end surface thereof, the fixing pins being inserted into the holes of the electro-optical device frame body, a light-incident surface of the prism having peripheral edges and a flat part of each of the fixing pins being fixed by an adhesive agent, and an inner portion of the holes and an outer peripheral surface of each of the fixing pins being fixed by an adhesive agent.

2. The projector according to claim 1, the contour of the electro-optical device frame body being disposed to proximately fit the peripheral edges of the light-incident surface of the prism.

3. The projector according to claim 2, the electro-optical device frame body having substantially a rectangular shape, and the holes being provided in four corners of the electro-optical device frame body.

4. The projector according to claim 1, the contour of the electro-optical device frame body being disposed to proximately fit within the peripheral edges of the light-incident surface of the prism.

5. The projector according to claim 4, the electro-optical device frame body having substantially a rectangular shape, and the holes being provided in four corners of the electro-optical device frame body.

6. The projector according to claim 1, the electro-optical device frame body having substantially a rectangular shape, and the holes being provided in four corners of the electro-optical device frame body.

7. The projector according to claim 1, each of the fixing pins having a deformed part at an end on a side different from a side on which the flat part is provided, and the deformed part protruding from a surface of the electro-optical device frame body.

8. The projector according to claim 1, each of the fixing pins having a barrel shape in which a central part of the fixing pin is expanded.

9. The projector according to claim 1, each of the fixing pins having a shape in which a central part of the fixing pin is made thinner than both ends of the fixing pin.

10. The projector according to claim 1, the periphery of the flat part of each of the fixing pins being chamfered.

11. The projector according to claim 1, a groove being provided in an outer peripheral surface on the side of the flat part of each of the fixing pins.

12. An electro-optical device-mounting unit that mounts an electro-optical device that modulates light to a prism, comprising:
   an electro-optical device frame body for holding the electro-optical device and having a plurality of holes provided in the periphery thereof; and
   fixing pins each having a flat part on one end surface thereof and inserted into the holes of the electro-optical device frame body, a light-incident surface of the prism and the flat part of each of the fixing pins being fixed by an adhesive agent, and an inner portion of the holes and an outer peripheral surface of each of the fixing pins being fixed by an adhesive agent.

13. The electro-optical device-mounting unit according to claim 12, the electro-optical device frame body having substantially a rectangular shape, and the holes being provided in four corners of the electro-optical device frame body.

14. The electro-optical device-mounting unit according to claim 13, each of the fixing pins having a deformed part at an end on a side different from a side on which the flat part is provided, and the deformed part protruding from a surface of the electro-optical device frame body.

15. The electro-optical device-mounting unit according to claim 12, each of the fixing pins having a deformed part at an end on a side different from a side on which the flat part is provided, and the deformed part protruding from a surface of the electro-optical device frame body.

16. The electro-optical device-mounting unit according to claim 12, each of the fixing pins having a barrel shape in which a central part of the fixing pin is expanded.

17. The electro-optical device-mounting unit according to claim 12, each of the fixing pins having a shape in which a central part of the fixing pin is made thinner than both ends of the fixing pin.

18. The electro-optical device-mounting unit according to claim 12, the periphery of the flat part of each of the fixing pins being chamfered.

19. The electro-optical device-mounting unit according to claim 12, a groove being provided in an outer peripheral surface on a side of the flat part of each of the fixing pins.

* * * * *